United States Patent Office 3,341,619
Patented Sept. 12, 1967

3,341,619
POLYMERIZATION OF CIS TYPE II OLEFINS
Eugene L. Stogryn, Fords, N.J., and Herbert F. Strohmayer, Wezembeek-Ophem, Brabant, Belgium, assignors to Esso Research and Engineering Company, a corporation of Delaware
No Drawing. Filed Apr. 13, 1964, Ser. No. 359,416
7 Claims. (Cl. 260—683.15)

This invention relates to the preparation of polymers of the cis isomer of Type II olefins and more particularly relates to the homopolymerization and copolymerization of the above olefins with a catalyst formed by the activation of a reducible transition metal compound with an organo-metallic compound.

The low pressure polymerization and copolymerization of alpha olefins with catalyst systems made up of a partially reduced heavy transition metal halide and a reducing metal containing compound is well known. See, e.g., Belgian Patent 533,362, "Chemical and Engineering News," Apr. 8, 1957, pages 12 through 16, and "Petroleum Refiner," Dec. 1956, pages 191 through 196.

However, heretofore the polymerization of internal olefins, i.e., Type II olefins, has not been successfully accomplished by the use of catalysts of the above type. Dr. G. Natta, one of the foremost authorities on olefin polymerization with Ziegler-type catalyst, stated in a letter to the editor of the Journal of the American Chemical Society, vol. 83 (1961), pages 3343 and 3344, "that with all the catalysts of the anionic coordinated type used by us no homopolymerization of butene-2 occurs."

It has now been found surprisingly that the cis isomer of $C_4$–$C_{12}$ Type II olefins can be successfully polymerized using as catalyst a transition metal compound of Groups IV-A, V-A, VI-A, VII-A, and VIII activated with an organo-metallic compound of Groups I-A and II-A of the Periodic Table.

The olefins polymerized by the present invention are cis isomers of $C_4$–$C_{12}$, preferably $C_4$ to $C_7$, Type II olefins. By Type II olefin is meant an olefin having one hydrocarbon group on each of the carbon atoms containing the olefin double bond: See "Science of Petroleum," vol. II, page 1349 (1938), by C. E. Boord. The hydrocarbon groups attached to the carbon atoms containing the olefin double bond can be straight or branched chain and are acyclic, alicyclic, or aralkyl. Examples of the olefins polymerized by the invention are cis 2-butene, cis 2-pentene, cis 2-hexene, cis 3-hexene, cis 4-methyl 2-pentene, cyclopentene, cyclohexene, cis 1-phenyl 2-butene, etc.

The low pressure polymerization catalysts useful for the present invention are reducible transition metal compounds of Groups IV-A, V-A, VI-A, VII-A and VIII of the Periodic System activated with from 0.5 to 10 moles, preferably 1 to 3 moles, of an organo-metallic compound of a metal of the A sub-group of Groups I and II of the Periodic Table (according to Textbook of Chemistry, 2nd edition, by Edward Mack, Jr., et al., Ginn and Company, 1956, page 313) per mole of transition metal compound. The reducible transition metal compounds which can be used include inorganic compounds such as the halides, oxyhalides, complex halides and organic compounds such as alcoholates, acetates, benzoates and acetyl acetonates. The metal halides, particularly the chlorides, are preferred. The transition metals include titanium, zirconium, hafnium, thorium, uranium, vanadium, niobium, tantalum, chromium, molybdenum, tungsten and manganese, with titanium, zirconium, and vanadium as the preferred metal components since they are the most active of the above metals. Titanium tetrachloride and titanium trichloride are preferred for use in the present invention. Preformed catalyst components can also be used, such as, for example, partially reduced heavy transition metal compounds alone or cocrystallized with a Group II or III metal halide, e.g., aluminum chloride, boron trichloride, zinc chloride and the like.

The organo-metallic compounds of metals of the A sub-group of Groups I and II of the Periodic Table useful in the present invention include the alkyl, cycloalkyl, aralkyl and aryl derivatives. Alkyl lithium compounds having from 2 to 20 carbon atoms per alkyl group, such as isopropyl lithium, and alkyl beryllium compounds having from 2 to 20 carbon atoms per alkyl group, such as diethyl beryllium, are particularly preferred for use herein.

The catalyst is prepared by contacting the transition metal halide with the organo-metallic compound in an inert diluent and in a non-oxidizing atmosphere with stirring.

The process of the invention is carried out by contacting the cis form of at least one $C_4$–$C_{12}$ Type II olefin in a hydrocarbon diluent at a temperature of from −50 to 200° C., preferably 10 to 90° C., and at a pressure ranging from atmospheric to 100 atmospheres, preferably 1 to 30 atmospheres, with the above catalyst and carrying out the polymerization for a time sufficient to produce the desired quantity of polymer. To obtain significant yields of polymer, the cis content of the monomer introduced to the polymerization zone should range from about 50 to 100 wt. percent, and preferably about 75 to 100 wt. percent. The reaction time is not critical and generally periods of time ranging from 0.5 to 2 hours are suitable in batch runs. The process can also be run continuously if desired. The catalyst slurry is preferably diluted with additional solvent to provide a catalyst concentration for the polymerization of about 1 to 20, preferably about 2 to 10 mole percent of total catalyst based on the olefin used. The polymer product concentration in the polymerization reaction mixture is preferably kept between about 2 and 25 wt. percent, based on the total contents present, so as to provide for easy handling of the polymerized mixture. When the desired quantity of polymer has been obtained, a $C_1$ to $C_8$ alkanol such as isopropyl alcohol or n-butyl alcohol, desirably in combination with a chelating agent such as acetylacetone or diacetyl is added to the reaction mixture to dissolve and deactivate the catalyst and to precipitate the polymer product from solution. The polymer product is then filtered if solid. Liquid polymer product is isolated by distilling off the polymerization diluent. The polymer can then be washed with alcohol or an acid such as hydrochloric acid. It is important that the polymerization reaction be carried out in the absence of catalyst poisons such as water, oxygen, sulfur compounds, and the like.

The diluents used for the polymerization reaction are straight and branched chain aliphatic hydrocarbons and aromatic hydrocarbons. Examples of the aliphatic hydrocarbons are n-heptane, n-hexane, n-decane, neopentane, isoheptane, etc. Examples of aromatic diluents are benzene, toluene, xylene, mesitylene, pseudocumene, ethylbenzene, cymene, tetralin, decalin, chlorobenzene, o-dichlorobenzene, orthochlorotoluene and the like.

Polymers prepared in accordance with the present invention are generally viscous oily polymers having a viscosity average molecular weight of at least 400 and are useful as viscosity index improvers in lubricating oils, or can be used themselves as lubricating oils. Additionally, the polymers can be sulfonated or sulfated to give a high quality detergent. Also, the polymers containing sufficient unsaturation are useful for the alkylation of benzene which, when followed by sulfonation of the resulting product, yields a completely oil soluble detergent. Also, by utilizing conventional oxidation and sulfonation procedures high molecular weight alcohols, carboxylic acids and sulfonic acids can be prepared from the polymers of the invention.

The invention will be better understood by reference to the following examples which are given for illustration purposes only and are not meant to limit the invention.

*Example 1*

Isopropyl lithium, 20 mmoles, in n-heptane was added to a solution of 10 mmoles of $TiCl_4$ in 500 ml. of n-heptane. Cis 2-butene was added to the catalyst suspended in n-heptane continuously during the polymerization, at the rate of 1100 cc./min. The polymerization was carried out at 50° C. for 51 minutes. The resulting oily polymer was isolated by treating the cooled reaction mixture with 20 ml. of acetone, followed by 200 ml. of 6 N hydrochloric acid. The organic layer was dried over anhydrous $MgSO_4$ and then subjected to distillation. 17.3 gms. of oily polymer were obtained with an average molecular weight of 415.

*Example 2*

Cis 2-butene was bubbled, at the rate of 1100 cc./min. into 200 ml. of n-heptane containing 8.8 mmoles of $BeEt_2$ and 3.5° mmoles of $TiCl_3$. The polymerization was carried out at 50° C. for 30 minutes. 16.5 gms. of polymer having an average molecular weight of 425 were obtained.

*Example 3*

Cis 2-butene was polymerized according to the process of Example 1 using the quantities of ingredients and polymerization conditions shown in Table I. 23.7 gms. of oily polymer were obtained.

*Example 4*

In order to demonstrate the applicability of the instant process to the cis isomers only, a run similar to that of Example 3 was carried out using trans 2-butene. Details are also given in Table I.

*Example 5*

The process of Example 1 was carried out using 140 gms. of 2-heptene as the olefin. The 2-heptene was an equimolar mixture of the cis and trans isomers. Details of this polymerization reaction are also given in Table I.

which does not polymerize to any appreciable extent by the process of the invention.

*Example 6*

Substantially equal molar amounts of cis 2-butene and cis 2-heptene are introduced into a solution of isopropyl lithium and vanadium tetrachloride in 1 liter of toluene. The molar ratio of isopropyl lithium to vanadium tetrachloride is about 3:1. The polymerization is conducted at a temperature of about 75° C. for a period of 2 hours. The resulting polymer obtained after filtration and washing is an oily material having a viscosity average molecular weight of about 500.

*Example 7*

An equal molar mixture of cis 2-pentene and cis 1-phenyl-2-butene is introduced into a solution of diethylberyllium and $TiCl_3 \cdot 0.33AlCl_3$ in 2 liters of n-heptane. The molar ratio of diethylberyllium to $TiCl_3 \cdot 0.33AlCl_3$ is about 2:1. The polymerization is conducted at a temperature of about 90° C. for a period of about 45 minutes. The resulting polymer obtained after filtration and washing is an oily substance having a viscosity average molecular weight of about 600.

Modifications in the present process can be carried out without departing from the scope and spirit of the invention.

What is claimed is:

1. A process for the polymerization of cis Type II olefins comprising contacting at least one monomer consisting solely of a $C_4$ to $C_{12}$ Type II olefin containing at least 50 wt. percent of the cis isomer of said olen, in an inert hydrocarbon diluent at temperatures of about $-50$ to 200° C. and at pressures ranging from atmospheric to 30 atmospheres, with a catalyst consisting essentially of a reducible halide of a transition metal of Group VIII and the A subgroup of Groups IV to VI activated with from about 0.5 to 5 moles of an alkyl metallic compound selected from the group consisting of alkyl-lithium and dialkylberyllium per mole of said halide, thereby forming a polymer of said cis isomer having a viscosity average molecular weight of at least 400, and recovering said polymer.

2. The process of claim 1 wherein the catalyst is an alkyllithium-titanium halide catalyst.

3. The process of claim 1 wherein the catalyst is a dialkylberyllium-titanium halide catalyst.

4. The process of claim 1 wherein the monomer is cis 2-butene.

5. The process of claim 1 wherein the polymerization temperature is from 10 to 90° C. and the diluent is an aliphatic hydrocarbon diluent.

6. A process for the polymerization of cis Type II olefins comprising contacting a monomer consisting solely of a $C_4$ to $C_7$ Type II olefin containing at least about 50 wt. percent of the cis isomer of said olefin, in an inert hydrocarbon diluent at a temperature of about $-50$ to

TABLE I

| Example | Monomer | i-PrLi (mmoles) | $TiCl_4$ (mmoles) | Li/Ti | Temp. (° C.) | Heptane (ml.) | Oily Polymer (g.) |
|---|---|---|---|---|---|---|---|
| 3 | Cis 2-butene | 13.2 | 13.2 | 1 | 58 | 600 | 23.7 |
| 4 | Trans 2-butene | 13.2 | 13.2 | 1 | 60 | 600 | 1.2 |
| 5 | 2-heptene [1] | 14.3 | 13.2 | 1.1 | 71 | 500 | 5.2 |

[1] The 2-heptene used was a mixture of the cis and trans isomer.

It can be seen from the above table that the polymerization of cis 2-butene gives a satisfactory yield of 23.7 gms. of oily polymer. However, trans 2-butene gave a yield of only 1.2 grams of polymer. The 2-heptene run (Example 5) gave a yield of 5.2 grams of oily polymer. The relatively lower yield of polymer from this run compared to the cis 2-butene run of Example 3 is undoubtedly due to the fact that one-half of the monomer is the trans isomer 200° C. and at pressures ranging from atmospheric up to 30 atmospheres, with a catalyst consisting essentially of a titanium halide activated with from about 0.5 to 5 moles of an alkyl metallic compound selected from the group consisting of diethylberyllium and isopropyl lithium per mole of said titanium halide, thereby forming a polymer of said cis isomer having a viscosity average molecular weight of at least 400, and recovering said polymer.

7. A process comprising the steps of polymerizing a monomer consisting solely of cis 2-butene in an inert hydrocarbon diluent at temperatures of about −50 to 200° C. and at pressures ranging from atmospheric to 100 atmospheres using as a catalyst titanium tetrachloride activated with 0.5 to 5 moles of isopropyl lithium per mole of said titanium tetrachloride, and recovering a polymer of said butene.

References Cited

UNITED STATES PATENTS

| | | | |
|---|---|---|---|
| 2,832,759 | 4/1958 | Nowlin et al. | 260—93.5 |
| 2,994,691 | 8/1961 | Gates | 260—93.7 |
| 3,066,123 | 11/1962 | Strohmayer et al. | 260—93.7 |

FOREIGN PATENTS

| | | |
|---|---|---|
| 538,782 | 12/1955 | Belgium. |
| 810,023 | 3/1959 | Great Britain. |
| 824,002 | 11/1959 | Great Britain. |

PAUL M. COUGHLAN, JR., *Primary Examiner.*

ALPHONSO D. SULLIVAN, *Examiner.*